(12) United States Patent
Naito et al.

(10) Patent No.: US 6,434,022 B1
(45) Date of Patent: Aug. 13, 2002

(54) HIGH VOLTAGE CIRCUIT

(75) Inventors: Kenji Naito, Shiga-ken; Hisashi Takiguchi, Omihachiman; Tadao Nagai, Shiga-ken; Masahiko Kitamoto, Shiga-ken; Tsuyoshi Umemoto, Shiga-ken, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/933,239

(22) Filed: Aug. 20, 2001

(30) Foreign Application Priority Data

Aug. 31, 2000 (JP) ........................................ 2000-262840

(51) Int. Cl.⁷ ............................................ H02M 3/335
(52) U.S. Cl. ................... 363/21.01; 363/21.12
(58) Field of Search ........................... 363/16, 17, 20, 363/21.01, 21.02, 21.03, 21.08, 21.07, 21.12, 21.15, 21.16, 21.17, 21.18, 97, 131

(56) References Cited

U.S. PATENT DOCUMENTS 4,563,731 A * 1/1986 Sato ............................ 363/17
4,980,811 A * 12/1990 Suzuji et al. ........ 363/21.17 X
5,963,437 A * 10/1999 Sekiya ..................... 363/21.16

* cited by examiner

Primary Examiner—Jessica Han
(74) Attorney, Agent, or Firm—Ostrolenk, Faber, Gerb & Soffen, LLP

(57) ABSTRACT

A high voltage generation circuit including a transformer, the transformer having a primary winding having a primary inductance; a power supply for supplying a voltage to the primary winding of the transformer; a switching element for controlling current flowing through the primary winding of the transformer from the power supply; and a resonance capacitor which resonates with the primary winding of the transformer when the switching element is off, so that a flyback pulse is generated. The circuit has a distributed inductance and a resonance capacitance. The switching element is controlled so as to be switched on nearly at the bottom of a quiescent ringing pulse which is produced by a resonance of the primary inductance of the transformer with a capacitance included in a circuit connected to the primary winding of the transformer, after the flyback pulse is generated.

4 Claims, 4 Drawing Sheets

HIGH VOLTAGE CIRCUIT

BACKGROUND OF THE INVENTION

1. Field of the Invention

The present invention relates to a high voltage generation circuit and, more particularly, to a high voltage generation circuit for generating a high voltage to be supplied to a CRT (cathode ray tube) or the like.

2. Description of the Related Art

FIG. 1 is a circuit diagram showing an example of a high voltage generation circuit as the background of the present invention. The high voltage generation circuit 10 includes a transformer 12. The primary winding of the transformer 12 is connected to the anode of a diode 14. The cathode of the diode 14 is connected to the drain of FET 16 as a switching element. The source of the FET 16 is connected to a resistor 18. The other side of the resistor 18 is grounded. A diode 20 is connected in parallel to the series circuit comprising the diode 14, the FET 16, and the resistor 18. The cathode of the diode 20 is connected to the anode side of the diode 14. The anode of the diode 20 is grounded.

A series circuit comprising a resonance capacitor 22 and a diode 24 is connected in parallel to the diode 20. One end of the resonance capacitor 22 is connected to the anode side of the diode 14, and the other end of the resonance capacitor 22 is connected to the cathode of the diode 24. The anode of the diode 24 is grounded. Moreover, the node between the resonance capacitor 22 and the diode 24 is connected to the anode of another diode 26. The cathode of the diode 26 is connected to the primary winding of the transformer 12 via a ringing suppression circuit 28. The ringing suppression circuit 28 comprises a capacitor 30, a resistor 32, and an inductor 34. A power supply+B is connected between the diode 26 and the ringing suppression circuit 28. The node between the diode 26 and the ringing suppression circuit 28 is grounded via a capacitor 36 and an electrolytic capacitor 38.

To the gate of the FET 16, a signal for on and off control thereof is provided from a PWM (Pulse Width Modulation) control circuit 40. Voltage produced by dividing a secondary output voltage of the transformer 12 is input to the PWM control circuit 40. This voltage and a horizontal driving signal are input to the PWM control circuit 40. The PWM control circuit 40 generates a control signal for controlling the FET 16. A node between the FET 16 and the resistor 18 is connected to a protection circuit provided in the PWM control circuit 40, so that an over-current flowing in the circuit is detected.

FIG. 2 shows waveforms at the respective portions of the high voltage generation circuit 10. FIGS. 2(a), (b), and (c), respectively represent the waveform chart of a signal for controlling the FET 16, the voltage at point A shown in FIG. 1, and the current flowing through the primary winding of the transformer 12. First, when the FET 16 is turned on at $t_0$, current flows from the power supply+B through the diode 14, the FET 16, and the resistor 18. Electromagnetic energy is stored in the primary winding of the transformer 12, due to the current.

The FET 16 is turned off at $t_1$. At this time, current flows from the primary winding of the transformer 12 through the resonance capacitor 22 and the diode 26, and the primary winding of the transformer 12 and the resonance capacitor 22 start to resonate. As shown in the waveform chart of FIG. 2(b), a flyback pulse is generated. The flyback pulse becomes maximum when all of the electromagnetic energy stored in the transformer 12 is converted to electrostatic energy of the resonance capacitor 22.

After all of the electromagnetic energy stored in the primary winding of the transformer 12 is transferred to the capacitor 22, reverse current flows through the diode 24, the resonance capacitor 22, and the primary winding of the transformer 12. Thus, the electrostatic energy in the resonance capacitor 22 is reversely converted to the electromagnetic energy in the primary winding of the transformer 12. At this time, the diode 14 prevents electric charge stored in the parasitic capacitance of the FET 16 from flowing out toward the primary winding side.

At $t_2$ when the flyback pulse is completed, the potential at the point A becomes zero. Then, the diode 20 is turned on, so that current flows from the ground side of the diode 20 into the primary winding of the transformer 12. The current increases the voltage at the point A. The voltage at the point A has the same potential as that of the power supply+B at $t_3$. At this time, the diode 20 is turned off, and the current becomes zero. Then, as regards the flow of current from the power supply+B into the resonance capacitor 22, the potential at both ends of the resonance capacitor 22 is clamped to the voltage of the power supply+B by a current-blocking clamp circuit comprising the diodes 24 and 26, so that no current flows from the primary winding of the transformer 12 into the resonance capacitor 22. Then, the FET 16 is turned on at $t_4$, so that current flows from the power supply+B toward the primary winding, and the circuit returns to the initial state at $t_0$. This operation is repeated. Thus, the circuit operation is continued. Accordingly, the voltage of the flyback pulse is increased by the transformer 12, so that high voltage is output from the secondary winding.

Capacitances included in the circuit, such as the parasitic capacitance in the FET 16, exist at $t_3$ when the current becomes zero. Accordingly, resonance with the primary winding of the transformer 12 occurs, and a quiescent ringing pulse is generated during the time from $t_3$ to $t_4$. The ringing suppression circuit 28 is used to suppress the ringing vibration pulse.

In the high voltage generation circuit 10, the primary inductance Lp of the transformer 12 is designed so as to satisfy the condition of $Lp \leq Eb \cdot Ts/Ipp$ in which Eb is a source voltage, Ts is the time from the completion of a flyback pulse to the start of the next flyback pulse, and Ipp is the allowed current of the FET 16. Conventionally, such a high voltage generation circuit is designed such that the above-mentioned condition is satisfied, and a required output voltage can be obtained from the secondary winding of the transformer 12.

However, if the FET is turned on nearly at the peak of the quiescent ringing pulse as shown in FIG. 3, the high voltage of the quiescent ringing pulse is instantaneously terminated. Thus, the ringing which is determined by the distributed capacitance of the transformer 12 and so forth is generated, so that overshoot and undershoot occur in current flowing through the primary winding of the transformer 12. The generation of such overshoot and undershoot causes a problem in that losses in the transformer 12 and a resistance loss in the ringing suppression circuit are increased.

SUMMARY OF THE INVENTION

Accordingly, it is a principal object of the present invention to provide a high voltage generation circuit in which the loss caused by overshoot and undershoot when the switching element is turned on can be reduced.

According to the present invention, there is provided a high voltage generation circuit which comprises a transformer, a power supply for supplying power to the primary winding of the transformer, a switching element for controlling current flowing through the primary winding of the transformer from the power supply, and a resonance capacitor which resonates with the primary winding of the transformer when the switching element is off, so that a flyback pulse is generated, the switching element being controlled so as to be switched on nearly at the bottom of a quiescent ringing pulse which is produced by the resonance of the inductance of the primary winding of the transformer with the capacitance included in a circuit connected to the primary winding of the transformer, after the flyback pulse is generated.

In the high voltage generation circuit, preferably, the control of the switching element is carried out by adjusting at least one of the primary inductance of the transformer, the distributed inductance, the voltage of the power supply, and resonance capacitance.

Since the timing at which the switching element is turned on in the high voltage generation circuit is controlled so as to occur nearly at the bottom of the quiescent ringing pulse, the quiescent ringing pulse is terminated in the low voltage portion thereof. Accordingly, overshoot and undershoot is suppressed from generating in the current flowing through the primary winding of the transformer, and losses in the transformer and the ringing suppression circuit can be reduced.

As seen in the above description, controlling the timing at which the switching element is turned on so as to coincide with the bottom of the quiescent ringing pulse or its neighborhood can be made by adjusting the primary inductance of the transformer, the distributed inductance, the voltage of the power supply, the resonance capacitance, and the like.

The above-described and other objects, features and advantages of the present invention will be apparent from the following detailed description of the preferred embodiments of the invention in conjunction with the accompanying drawings.

BRIEF DESCRIPTION OF THE DRAWING(S)

DETAILED DESCRIPTION OF EMBODIMENTS OF THE INVENTION

Figure 1:
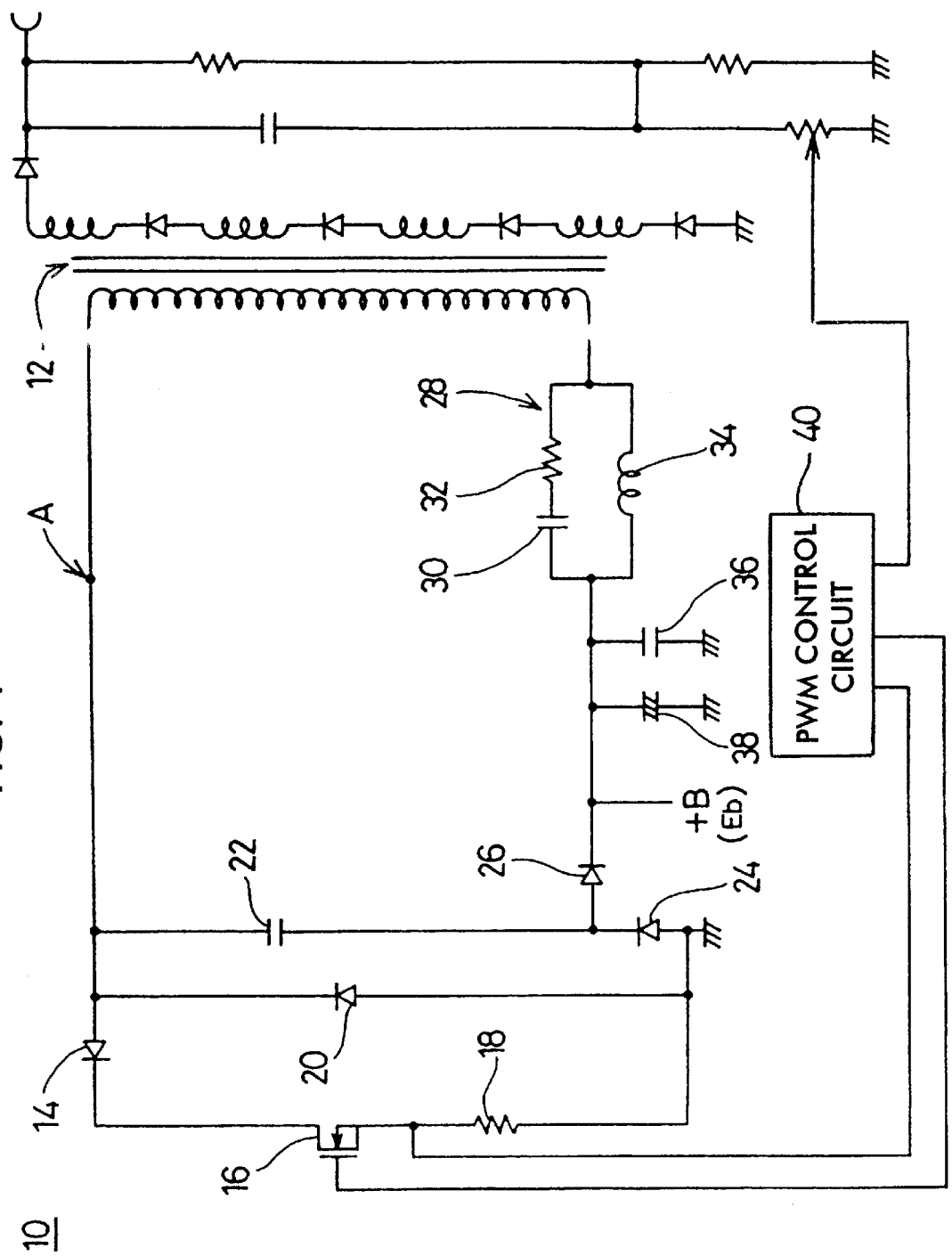
FIG. 1 is a circuit diagram of an example of a high voltage generation circuit as the background of the present invention.
Figure 2:
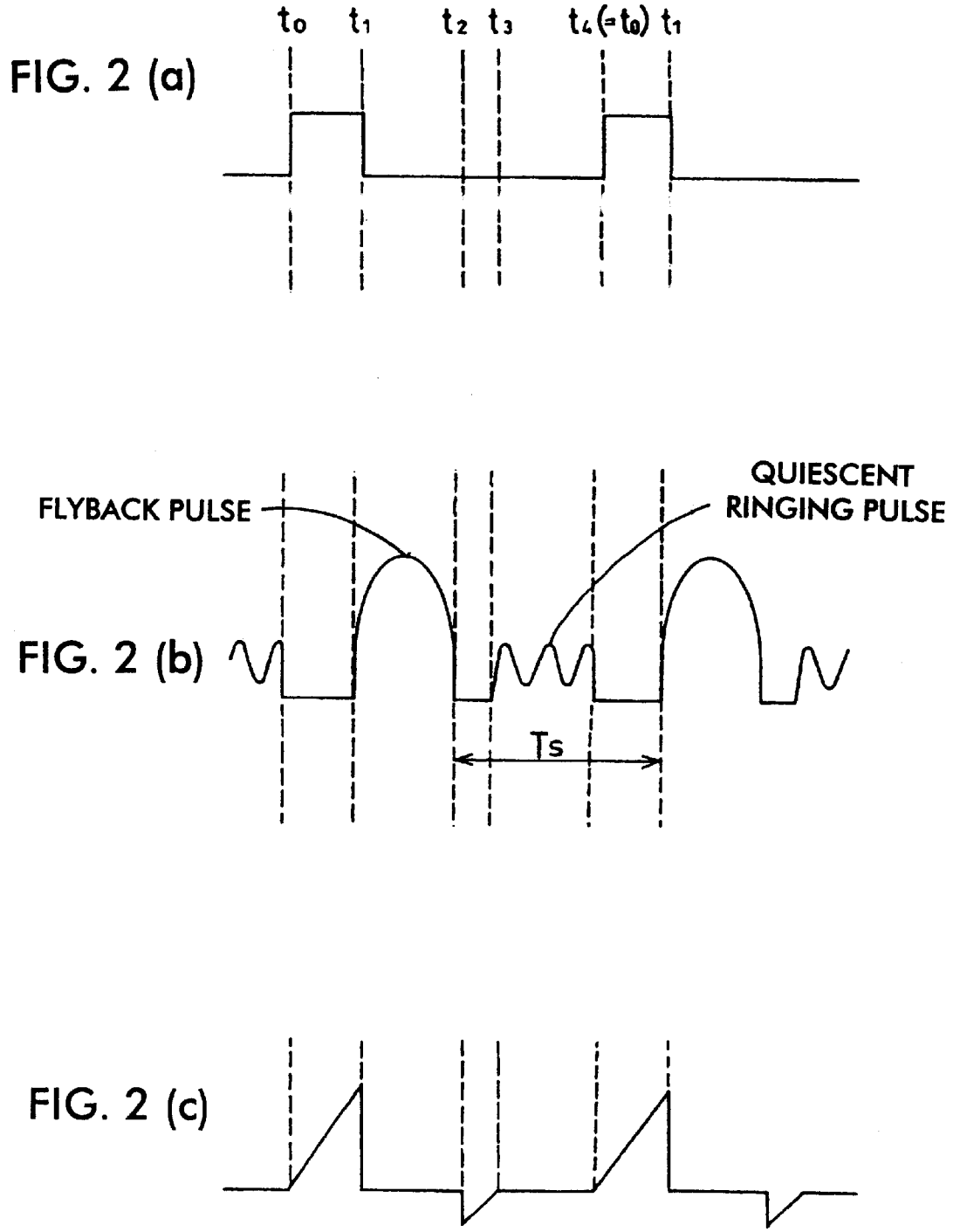
FIG. 2($a$) shows a signal for controlling FET of FIG. 1, FIG. 2($b$) shows voltage at point A of FIG. 1, and FIG. 2($c$) shows current flowing through the primary winding of the transformer of FIG. 1.
Figure 3:
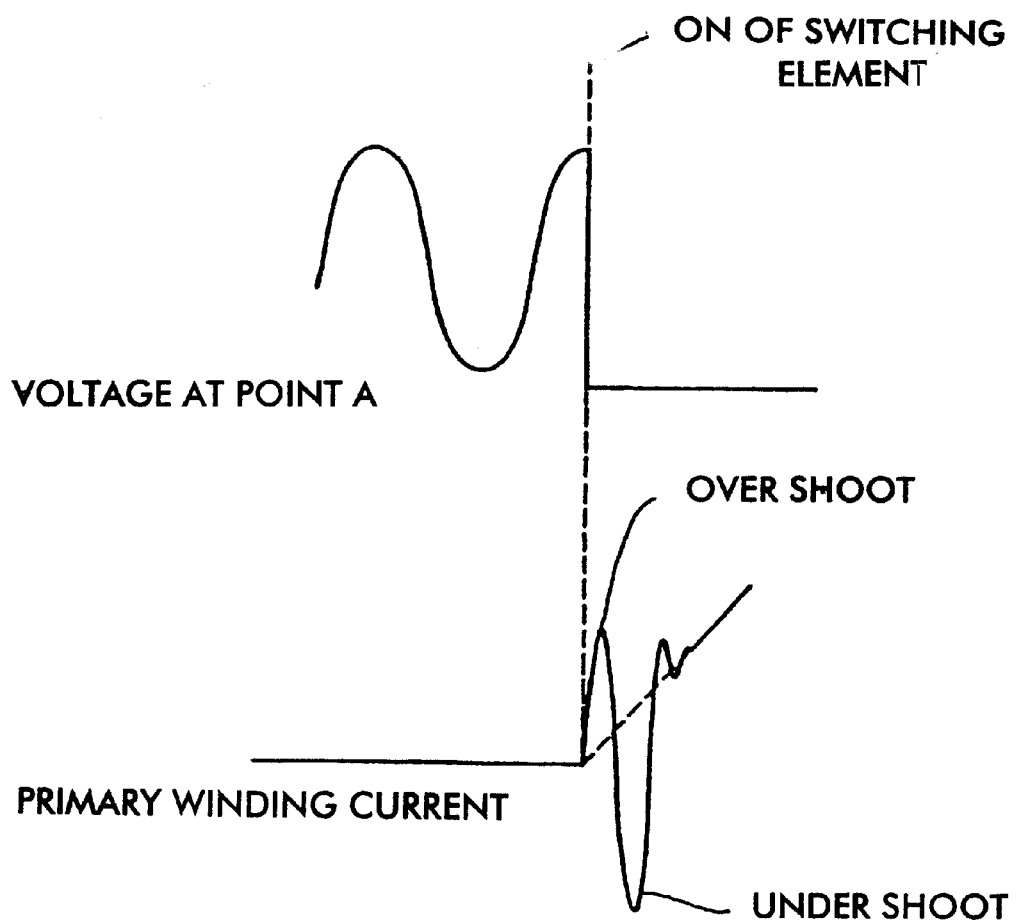
FIG. 3 is a waveform chart of current flowing through the primary winding when the FET is turned on nearly at the top of a quiescent ringing pulse.
Figure 4:
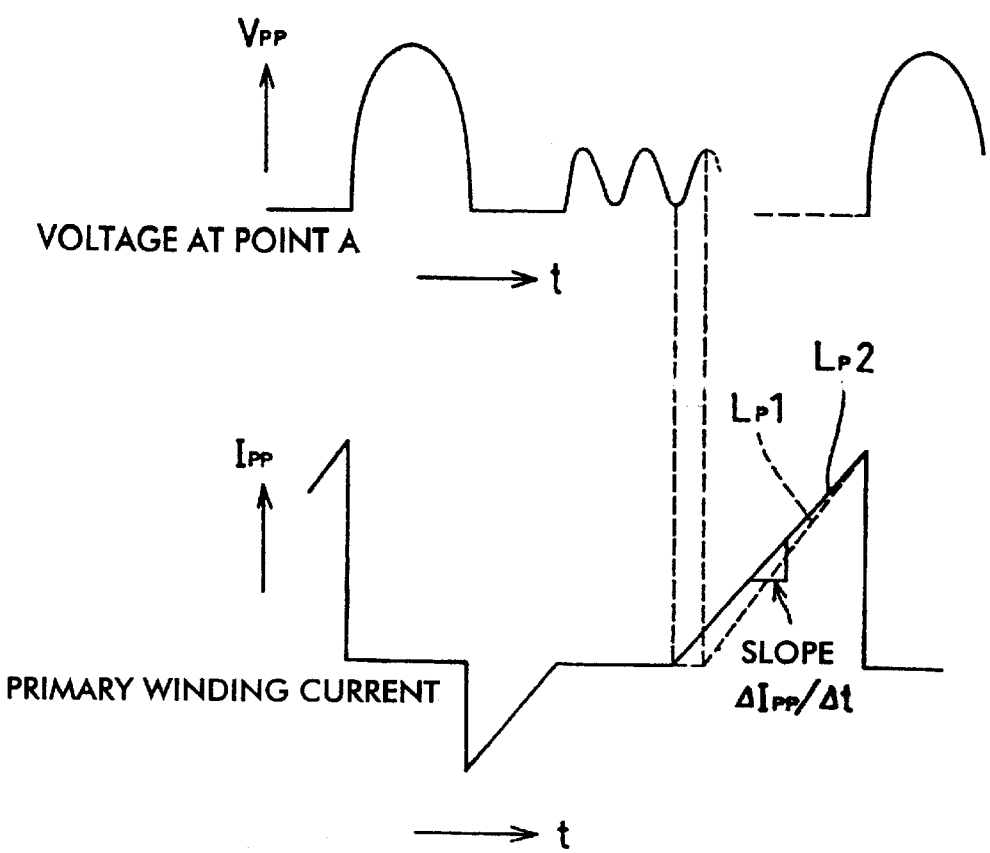
FIG. 4 illustrates a relation between the quiescent ringing pulse and the current flowing through the primary winding when the primary inductance of the transformer is changed.

In the high voltage generation circuit 10 shown in FIG. 1, the primary inductance Lp of the transformer 12 has a maximum control limit in the PWM control system, expressed by the condition of $Ipp=Eb \cdot Ts/Lp$ in which Eb is the power supply voltage, Ts is the time from the completion of a flyback pulse to the start of the next flyback pulse, and Ipp is the allowed current of the FET 16. Therefore, the high voltage generation circuit 10 to be operated in the PWM control system is designed so as to satisfy the condition of $Lp \leq Eb \cdot Ts/Ipp$. Moreover, the time at which the FET 16 starts to switch on can be set to coincide substantially with the bottom of the quiescent ringing pulse by controlling the primary inductance of the transformer 12, the distributed inductance, the voltage of the power supply+B, the resonance capacitance, and so forth.

For example, the primary inductance of the transformer 12 can be controlled by adjustment of the number of turns of the transformer 12. The current flowing through the primary winding when the primary inductance Lp of the transformer 12 is changed will be discussed. The slope of the current waveform caused when the FET 16 is on is defined by $\Delta[pp]/\Delta t$. Here, the allowed current Ipp is $Ipp=Eb \cdot t/Lp$. Thus, the slope of the current flowing through the primary winding of the transformer 12 can be expressed as $Eb/Lp$. Accordingly, when the primary inductance Lp of the transformer 12 is adjusted from Lp1 to Lp2 (Lp2>Lp1), the slope of the current waveform is reduced. Thus, the timing at which the FET 16 is turned on can be made earlier. By adjusting the primary inductance Lp of the transformer 12 as described above, the time at which the FET 16 starts to be turned on can be controlled. Thus, the time at which the FET 16 starts to be turned on can be made to coincide substantially with the bottom of the quiescent ringing pulse.

Moreover, the on-start time of the FET 16 may be controlled so as to coincide substantially with the bottom of the quiescent ringing pulse by adjusting the resonance capacitance of the circuit connected to the primary winding of the transformer 12. Thus, the on-start time of the FET 16 may be controlled, or the time when the quiescent ringing pulse is generated may be controlled. Any manner may be employed, provided that the on-start time of the FET 16 can be made to coincide substantially with the bottom of the quiescent ringing pulse.

Figure 5:
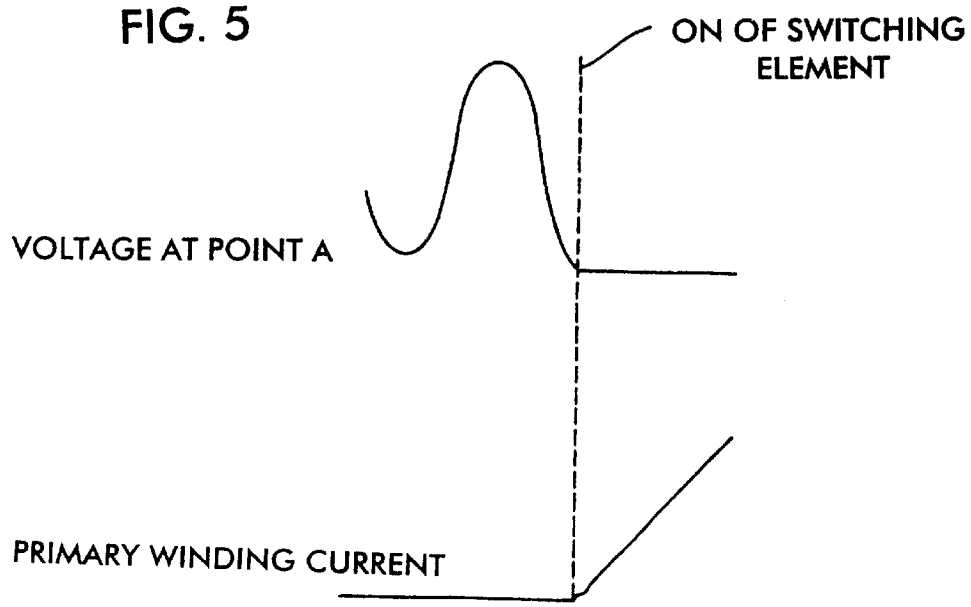
FIG. 5 is a waveform of current flowing through the primary winding when the FET is turned on nearly at the bottom of the quiescent ringing pulse.

As shown in the above description, by turning on the FET 16 nearly at the bottom of the quiescent ringing pulse, the quiescent ringing pulse can be terminated when the voltage is in the low state. Therefore, substantially no overshoot or undershoot in the waveform of current flowing through the primary winding of the transformer 12 is generated when the FET 16 is turned on as shown in FIG. 5. Accordingly, losses in the transformer 12 and in the ringing suppression circuit 28, which may be caused by the overshoot or undershoot, can be suppressed. Moreover, the whole power consumption of the high voltage generation circuit 10 can be reduced. These effects can be also obtained for a high voltage generation circuit excluding the clamping circuit comprising the diodes 24 and 26.

In the high voltage generation circuit according to the present invention, the overshoot or undershoot of current flowing through the primary winding of the transformer can be suppressed, and thereby, losses in the transformer and in the ringing suppression circuit can be reduced. Accordingly, the power consumption of the high voltage generation circuit can be decreased.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A high voltage generation circuit comprising:
a transformer, the transformer having a primary winding having a primary inductance;
a power supply for supplying a voltage to the primary winding of the transformer;
a switching element for controlling current flowing through the primary winding of the transformer from the power supply; and
a resonance capacitor which resonates with the primary winding of the transformer when the switching element is off, so that a flyback pulse is generated;
the circuit having a distributed inductance and a resonance capacitance;
the switching element being controlled so as to be switched on nearly at the bottom of a quiescent ringing pulse which is produced by a resonance of the primary inductance of the transformer with a capacitance included in a circuit connected to the primary winding of the transformer, after the flyback pulse is generated.

2. The high voltage generation circuit of claim 1, wherein the control of the switching element is made by adjusting at least one of the primary inductance of the transformer, the distributed inductance, the voltage of the power supply, and the resonance capacitance.

3. A method for controlling the on-timing of a switching element of a high voltage generation circuit, the circuit comprising:
a transformer, the transformer having a primary winding having a primary inductance;
a power supply for supplying a voltage to the primary winding of the transformer;
a switching element for controlling current flowing through the primary winding of the transformer from the power supply; and
a resonance capacitor which resonates with the primary winding of the transformer when the switching element is off, so that a flyback pulse is generated;
the circuit having a distributed inductance and a resonance capacitance; the method comprising:
controlling the switching element so as to switch the switching element on nearly at the bottom of a quiescent ringing pulse which is produced by a resonance of the primary inductance of the transformer with a capacitance included in a circuit connected to the primary winding of the transformer, after the flyback pulse is generated.

4. The method of claim 3, wherein the step of controlling the switching element comprises adjusting at least one of the primary inductance of the transformer, the distributed inductance, the voltage of the power supply, and the resonance capacitance.

\* \* \* \* \*